(12) United States Patent
Suzuki et al.

(10) Patent No.: US 7,896,634 B2
(45) Date of Patent: Mar. 1, 2011

(54) FILM STRETCHING APPARATUS

(75) Inventors: Nobuyuki Suzuki, Kanagawa (JP);
Kazunori Osaki, Kanagawa (JP);
Hitoshi Ikeda, Kanagawa (JP);
Toshinao Arai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1361 days.

(21) Appl. No.: 11/091,551

(22) Filed: Mar. 29, 2005

(65) Prior Publication Data
US 2005/0211387 A1    Sep. 29, 2005

(30) Foreign Application Priority Data
Mar. 29, 2004    (JP) ............... 2004-097054

(51) Int. Cl.
*B29C 55/16* (2006.01)
(52) U.S. Cl. .............. 425/66; 425/73; 425/297; 425/404; 425/445; 425/DIG. 53
(58) Field of Classification Search ............... 425/66, 425/73, 297, 404, 445, DIG. 53
See application file for complete search history.

(56) References Cited

U.S. PATENT DOCUMENTS

| | | | | |
|---|---|---|---|---|
| 2,698,967 A | * | 1/1955 | Reichel et al. | 264/197 |
| 2,912,716 A | * | 11/1959 | Frownfelter et al. | 425/73 |
| 2,918,696 A | * | 12/1959 | Bottoms et al. | 264/291 |
| 5,512,229 A | * | 4/1996 | Bosse et al. | 264/161 |
| 6,099,791 A | * | 8/2000 | Shannon et al. | 264/544 |
| 2004/0099992 A1 | * | 5/2004 | Merrill et al. | 264/290.2 |

FOREIGN PATENT DOCUMENTS

JP    2002-265636 A    9/2002

* cited by examiner

*Primary Examiner*—Yogendra N Gupta
*Assistant Examiner*—Joseph Leyson
(74) *Attorney, Agent, or Firm*—Sughrue Mion, PLLC

(57) ABSTRACT

In a tenter dryer, while a film is dried, the stretch or the relaxation of the film are made. The tenter dryer includes first-third drying chambers for independently controlling the drying conditions and a shiftable stretch/relaxation device for making the stretch and the relaxation of the film with holding the film. When the stretch/relaxation device holds four edges, cutter blades provided in a drying nozzle cut the film to sheet films. Then while holding the film, the stretch/relaxation device moves between the first-third drying chambers in which drying conditions are previously controlled.

2 Claims, 12 Drawing Sheets

FILM STRETCHING APPARATUS

BACKGROUND OF THE INVENTION

1. Field of the Invention

The present invention relates to a film stretching apparatus and a film stretching method for producing a high-functional film, and especially to a film stretching apparatus and a film stretching method for producing a wide variety of an optical films in small quantities.

2. Description Related to the Prior Art

A polymer film used in an optical field is produced by a melt-extrusion method or a solution casting method. In the melt-extrusion method, powder or pellets of polymers are heated and melt, and the melt polymer is extruded from a die to form a thin film. Then the thin film is cooled so as to be the film. In the solution casting method, the polymer and the solvent are mixed so as to be a dope, which is cast onto a support from a die to form a casting film. Having the self-supporting properties, the casting film is peeled, and dried so as to be a film. The support is a drum or belt that continuously runs.

There are several sorts of the polymer for the film. Especially, cellulose acylate is often used as the polymer in an optical field, since cellulose acylate has transparency, adequate moisture permeability, large mechanical strength, and low dependence of dimensional resistances on moisture and temperature. When the cellulose acylate is used as the raw material of the film, the solution casting method is often applied to the film production.

In the solution casting method, a continuous film is which the solution casting method on the prior art is applied will be explained in reference with FIG. 17. A film production equipment 200 is a continuous type and includes a casting apparatus 201, a dry-stretching device 202, a roller-drying apparatus 203 and a winding apparatus 204.

The casting apparatus 201 includes a support 206 and a casting die 207. The dry-stretching device 202 is called a tenter device having an air-conditioner (not shown) for air ventilation in the dry-stretching device 202. Further, a necessary number of rollers 209 for supporting the film is provided between or in the devices or apparatuses.

In the casting apparatus 201, a dope 212 is cast from the casting die 207 onto a support 206 such as the drum and the like, so as to form a casting film. Then, from the support 206, the casting film is peeled as a film 213 with content of the solvent. The film 213 is transported to the dry-stretching apparatus 202 which includes drying sections A1-An. In each of the drying sections A1-An, a drying air is fed toward the film 213. The temperature and the wind speed are controlled in each drying section A1-An. Further, in the dry-stretching apparatus 202, the film 213 is transported with holding both side edge portions of the film 213. Note that a holding device (not shown) is a tenter clip or a holding pin. The dry-stretching apparatus 202 stretches the transported film in a predetermined direction while drying. The holding apparatus releases the film 213 at a predetermined position near an exit of the dry-stretching apparatus 202.

After the dry-stretching apparatus 202, the drying apparatus 203 dries the film 213 with transportation with use of the roller 203a and the like, and thus the solvent in the film 213 evaporates. A surface treatment device may be provided in the drying apparatus 203 for performing a predetermined surface treatment. The air conditioner includes a gas concentration sensor and a temperature sensor for respectively detecting a gas concentration in the dry-stretching apparatus 202 and the drying apparatus. The air conditioner further includes a controller (not shown) for controlling the drive of the air conditioner on the basis of the results of the gas concentration sensor and the temperature sensor. Thus the concentration of the solvent gas and the temperature in the dry-stretching apparatus 202 and the drying apparatus 203 are controlled. In the winding apparatus 217, the both side edge portions are slit off such that the dried film 213 may have a predetermined width, and thereafter the film 213 is wound. The continuous solution casting equipment is adequate for mass production in which the conditions for film production is uniform, as described in Japanese Patent Laid-Open Publication No. 2002-265636.

Recently, however, it is necessary to produce many sorts of the films in accordance with use or request of the users, and further, the quantities of the produced film is sometimes small. In the case of the production of the small quantities of the films, the continuous solution casting as described in the publication No. 2002-265636 has following problems:

(1) Since the quantity of the materials to be prepared is much larger than the corresponding quantity to each sort of the film to be produced:
(2) It is hard to change the producing condition, especially the drying condition corresponding to the sort of the film to be produced, and a long time is lost for changing the conditions. Further it is hard to change the conditions substantially:
(3) Even if the production number is small, the film production is stably made under basic conditions, and thereafter the conditions are changed to those for producing the objected film. In this case, it takes long time until the film production is stably made after the change of the condition for the objected film production. Further, before the production after the change becomes stable, the film splits. In this case, many people and time are necessary for recovery of the running:
(4) The stretching direction in the dry-stretching apparatus is restricted in the widthwise direction or the lengthwise direction:
(5) Even if it is designated to change the drying condition depending the sorts of the film, the drying conditions are restricted because of the structure of the equipment:
(6) The equipment is large.

SUMMARY OF THE INVENTION

An object of the present invention is to provide a stretching apparatus and a stretching method by which a stretch and a relaxation of a wide variety of an optical films in small quantities in any direction at any stretch ratio with the drying can be produced.

Another object of the present invention is to provide a stretching apparatus and a stretching method by which a stretch and a relaxation of a film can be also made after the drying.

In order to achieve the object and the other object, a film stretching apparatus of the present invention includes a cutting device for cutting a continuous film to sheet films, and a stretching device for stretching each of the sheet films to a predetermined direction. Preferably, the stretching device includes a first stretcher for stretching the sheet film in a first direction and a second stretcher for stretching the sheet film in a second direction perpendicular to the first direction. At least one of the first and second stretchers has a holder for holding edges of the sheet film and a shifting mechanism for shifting the holder. The sheet film is stretched while the holder holds four sides of said sheet film. Particularly preferably, the film stretching apparatus further includes a liquid applying device for previously making the sheet film or the continuous film absorb the solvent or the water.

As another preferable embodiment of the present invention, a film stretching apparatus includes a drying chamber for drying a film containing a solvent or a water, a cutting device for cutting the film to sheet films before or during the drying, and a stretching device for stretching the sheet film in a predetermined direction in the drying chamber.

As still another preferable embodiment of the present invention, a film stretching apparatus includes plural drying chambers for drying a film containing a solvent or a water, a cutting device for cutting the film to sheet films before or during the drying, and a stretching device for stretching the sheet film in a predetermined direction in the drying chambers. The film stretching apparatus further includes a controller for independently controlling the drying conditions in each drying chamber. The stretching device includes a first stretcher for stretching the film in a first direction and a second stretcher for stretching the film in a second direction perpendicular to the first direction. At least one of the first and second stretchers has a holder for holding edges of the sheet film and a shifting mechanism for shifting the holder.

Preferably, the sheet film is stretched while the holder holds each of the four sides of the sheet film. Preferably, the stretching device includes a moving mechanism for moving from one to another one of the drying chambers.

Preferably, the film stretching apparatus further includes a liquid applying device for previously making the film absorb the solvent and the water. The cutting device is provided in at least one of the drying chambers.

In a film stretching method of the present invention, a continuous film is cut into sheet films, and each of the sheet film is stretched in a predetermined direction.

Preferably, the stretching is made while edges of the sheet films are held. Further, the stretching is made during the drying. In the film stretching method, the film is made to adsorb the solvent or the water.

In another film stretching method of the present invention, a film is dried and cut to sheet films before or during the drying. The sheet film is stretched in a first direction.

Preferably, the film or each of the sheet film contains the solvent or a water during the drying, and drying conditions in the drying are varied. The drying is made in plural drying chambers and the drying conditions are independently controlled between the drying chambers. Particularly preferably, the sheet film is stretched in a second direction perpendicular to the first direction. Further, at least one of the stretching in the first direction and the stretching in the second direction is made during the hold of edges of the sheet film. Especially preferably, the stretching in the first and second directions is made during the drying. Further, it is preferable that the film is made to absorb the solvent or the water.

According to the invention, the film stretching apparatus can be miniaturized and stretches the film in any direction along one axis or two axes, and a wide variety of an optical films in small quantities can be produced with high efficiency. Further, in the film stretching apparatus of the present invention, the drying of the film can be also made after the stretching.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
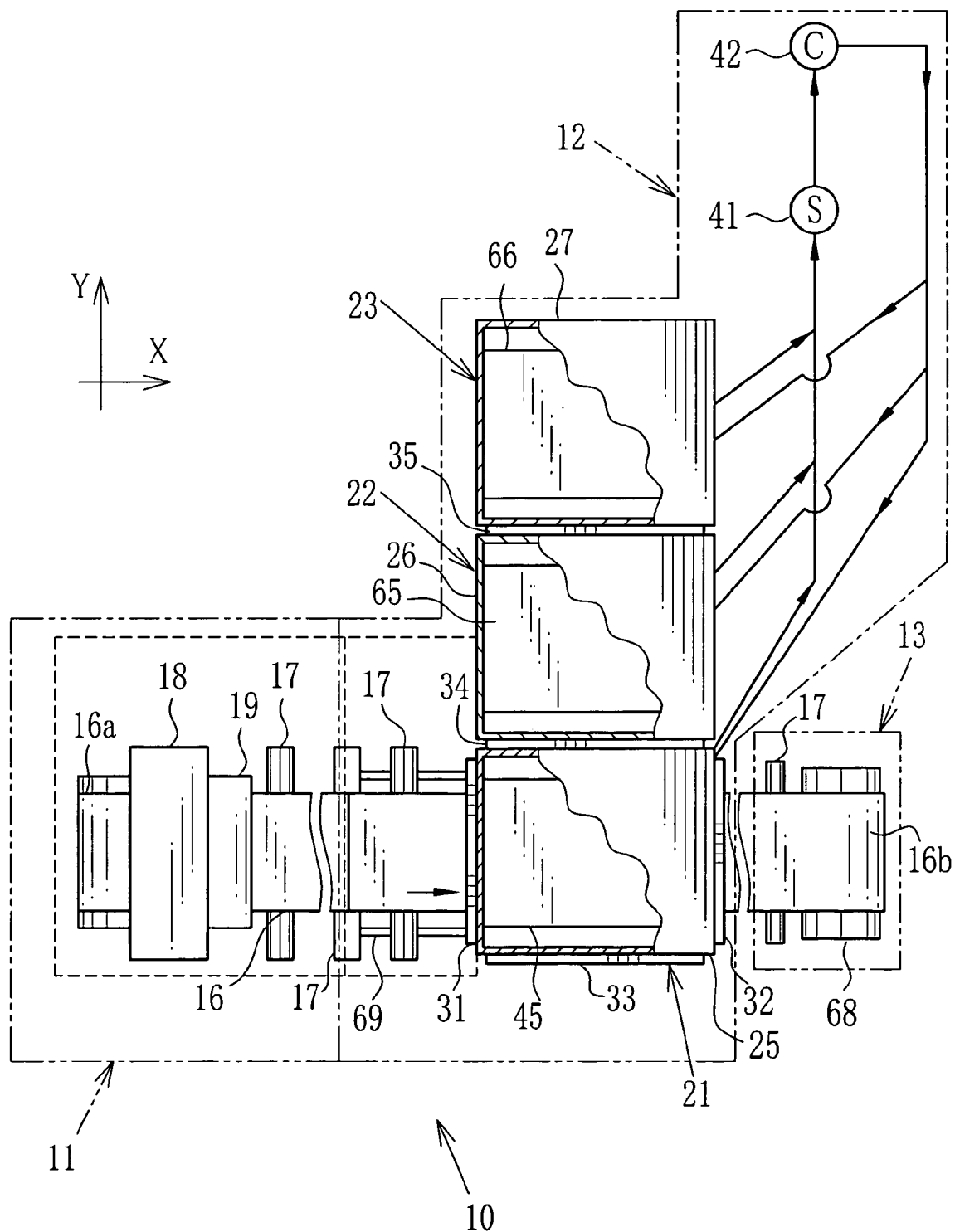
FIG. 1 is a schematic diagram of a film production equipment in which a film stretching apparatus of the present invention is used.

As shown in FIG. 1, a film production equipment 10 includes a casting apparatus 11, a tenter dryer 12, and a winding apparatus 13, between or in which there are rollers 17 for transporting a film 16. In this figure, however, only some of the rollers 17 are illustrated for easiness. An area from the casting apparatus 11 to the tenter dryer 12 is tightly closed as shown by a dotted line. Thus a temperature and the pressure can be easily controlled from the casting to the entering of the film 16 into the tenter dryer 12, and the mixture and the adhesion of the dusts and the like into and to the film 16 are prevented. Note in the following explanation that a direction for transporting the film 16 from the casting apparatus 11 to the winding apparatus is defined as x-direction along X-axis and one of widthwise directions of the film 16, which is directed upwards in this figure, is defined as y-direction along Y-axis.

The casting apparatus 11 includes a casting die 18 and a drum 19. The casting die casts 18 onto the drum 19 a dope which is supplied from a source, and the drum 19 is a casting support. Note that, instead of the drum 19, a band supplied by back-up rollers for continuous conveyance may be used. The casting die 18 has a temperature controller (not shown) for controlling the predetermined temperature of the dope to be cast. Further, the drum 19 is provided with a temperature controller (not shown) for controlling a surface temperature of the drum 19.

Figure 2:
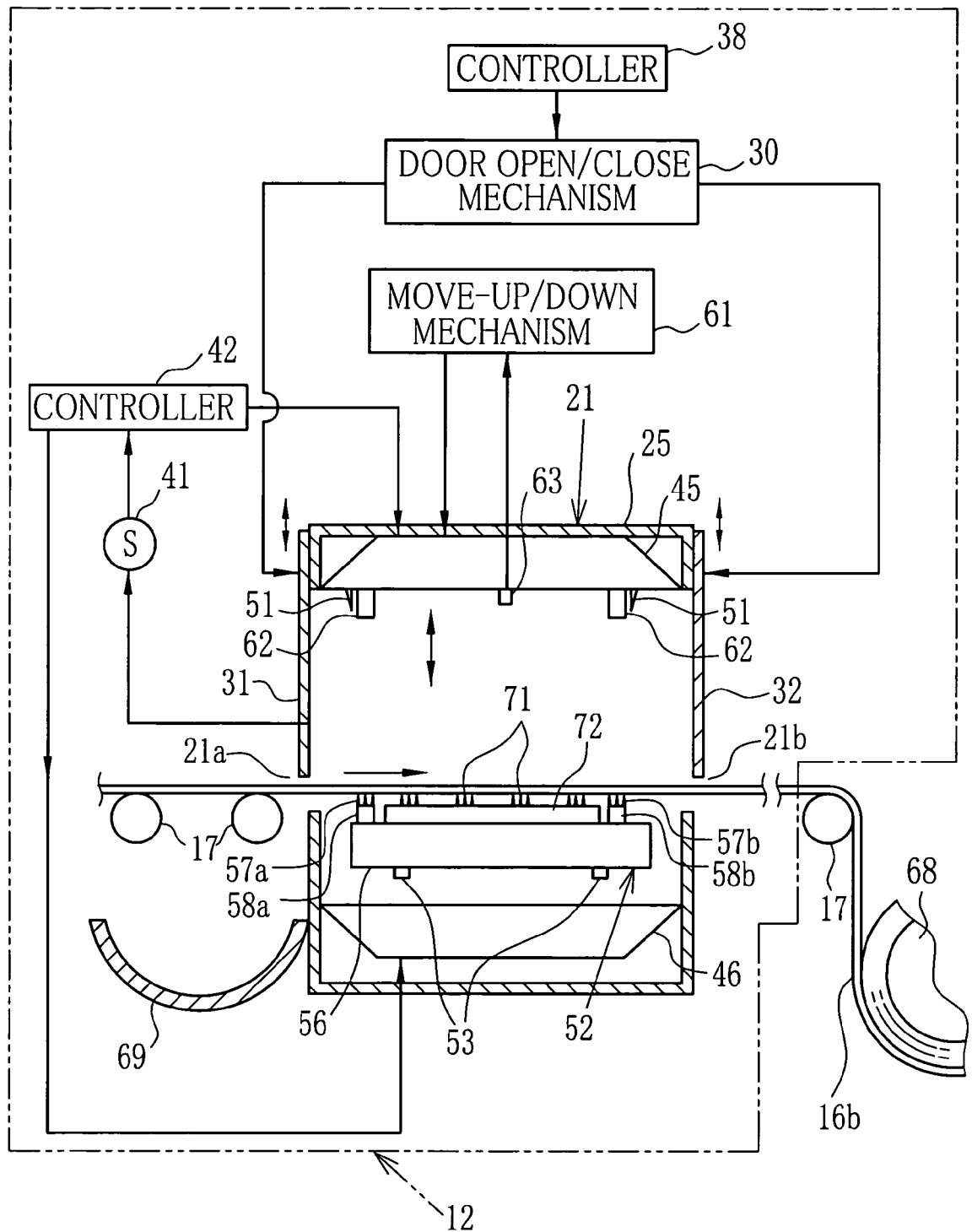
FIG. 2 is a sectional view of a tenter dryer.

The tenter dryer 12 includes first-third drying chambers 21-23 which respectively have main bodies 25-27 and automatic doors 31-35 whose opening and closing are regulated by the door open/close mechanism 30 (see, FIG. 2). The door open/close mechanism 30 is controlled by a controller 38 programmed for opening and closing the doors 31-35. In this embodiment, since the first drying chamber 21 receives the film 16 from the casting apparatus 11 and passes the film 16 to the winding apparatus 13, the first drying chamber 21 has an entrance 21a and an exit 21b, which are opened and closed by the respective doors 31, 32. Then the film 16 is transported from the casting apparatus 11 toward the winding apparatus 13. The door 33 is open and closed when a check and a cleaning in the first-third drying chambers 21-23 are made. Further, the door 34 is opened and closed between the first and second drying chambers, and the door 35 is between the second and third drying chambers, so as to independently control environments in the first-third drying chambers 21-23. Note other automatic doors may be provided so as to change the relative positions thereof by providing interchangeability between the first-third drying chambers 21-23. Further, the number of the drying chamber is not restricted in 3, and may be larger or smaller adequately.

Each drying chamber 21-23 includes a sensor 41 and a controller 42 for independently controlling the inner environments. In the first-third drying chambers 21-23, water and the solvent are evaporated from the film 16 containing the water and the solvent, as described below. Then, the adequate sensor 41 detects the temperature, and the moisture or the concentration of the solvent vapor in the drying chambers 21-23. The conditions of the temperature, and the moisture or the concentration of the solvent gas in the first-third drying chambers are controlled by the controller 42 on the basis of the detecting results of the sensor 41.

As shown in FIG. 2, the first drying chamber 21 is provided with upper and lower drying nozzles 45, 46. The lower drying nozzle 46 is disposed so as to confront to a peeled surface of the film 16, and the upper drying nozzle 45 is disposed so as to confront to an exposed surface as another surface. The temperature control and the air exchange in the first drying chamber 21 are made in accordance of the change of the conditions by the controller 42.

Further, the first drying chamber is provided with a pair of cutter blades for cutting the film 16 and a movable stretch/relaxation device 52 for performing the stretch and the relaxation in any direction. The cutter blades 51 are disposed in an upstream edge region and a downstream edge region of the drying nozzle 45, and the transported continuous film 16 is cut in the widthwise direction into sheet films. Note that the cutter blades 51 may not be disposed to the drying nozzle 45 but on a shiftable stage 56 of the stretch/relaxation device 52.

The stretch/relaxation device 52 includes the shiftable stage 56 provided on a shaft 53a (See, FIGS. 3-5) of a moving mechanism 53 (See, FIGS. 3-5), first pins 57a, 57b and second pins 71a, 71b for holding the film. The shiftable stage 56 is shifted among the first-third drying chambers 21-23 by driving the shafts 53a. The first pins 57a, 57b are provided with first pin stage 58a, 58b so as to be over the slidable stage 56. The first pins 57a, 57b are apart from each other in a X-axis direction, and the first pin stages 58a, 58b as well. Further, as described below in detail, in FIGS. 3&6, the first pin stage 58a is movable in the shiftable stage 56 and the first pin stage 58b is fixed to the shiftable stage 56. Thus the front edge and the back edge of the sheet film 16b to be obtained by cutting the continuous film 16 are held by the first pins 57a, 57b. Similarly, as shown in FIG. 6, the second pins 71a, 71b are provided with second pin stage 72a, 72b so as to be over the slidable stage 56. The second pins 71a, 71b and the second pin stages 72a, 72b are apart from each other in a Y-axis direction. Thus the both side edges of the film 16 are held by the second pins 71a, 71b.

On each pin stage 58a and 58b, a rail 58c, 72c is formed, and on the rail 58c, pin blocks of the first pins 57a, 57b are slid in the Y-axis direction. Further, on each pin stage 72a and 72b, a rail 72c is formed, and on the rail 72c, pin blocks of the second pins 72a, 72b are slid in the X-axis direction. In each pin block, there plural pins, and as described below, the stretch and the relaxation of the sheet film 16b is made by changing the distance between the first pins 57a and 57b or the second pins 71a and 71b. Accordingly, the tear of the film 16 from the edges is prevented. The pin blocks, before holding, are previously positioned at the same distance in the rails 58c, 72c by a pin block initially positioning device (not shown). After the positioning, the pin blocks is freely slidable on the rails 58c, 72c. Note that, instead of the pins 57a, 57b, 71a, 71b in the pin blocks slidable in the rails 58c, 72c, the pins may be fixed on the pin stages.

As shown in FIG. 2, the drying nozzle 45 is shiftable in up- and downward directions between a drying and cutting positions by a move-up/down mechanism 61, and press members 62 for pressing the film 16 are provided in edge portion of the drying nozzle 45, such that the pins 57a, 57b, 71a, 71b are pricked into the film 16. Note that the distance between the drying nozzle 45 and the film 16 is detected by a sensor 63, and the position of the drying nozzle 45 is controlled by the move-up/down mechanism 61 on the basis of the result of the detection.

The second and third drying chambers 22, 23 also have two drying nozzles above the peeled and another surfaces of the film 16. However, the drying nozzles above the another surface is not shown, but only drying nozzles 65, 66 above the peeled surfaces are illustrated in FIG. 1. In this embodiment, as described below, the cutter blades and the press members for cutting the film 16 are not provided in the second and third drying chamber 22, 23 but only with the drying nozzle 45 in the first drying chamber 21. The drying nozzles 65, 66 don't have the shifting mechanism for the shifting thereof. Note that the cutting, the stretch and the relaxation of the film 16 are explained in detail with use of another figure.

In the first-third drying chambers 21-23, not only the drying at the high temperature but also the cooling is made. Since the cooling is made, the film 16 becomes in the predetermined condition, in view of the hardness. Further, at least one of the drying nozzles in each drying chamber includes at least decompression device for making the inner pressure lower, and the control of the inner pressure is made by the controller 42.

In the upstream side from the first drying chamber 21 into which the film 16 is transported, a receiver 69 is disposed. On a top of the receiver 69 there is an opening. When the film 16 is cut off to the film 16 by the cutter blade 51, the sheet film 16b falls down to enter into the receiver 69. Further, the winding apparatus 13 has a winding shaft 68 for winding the film 16 containing the water or the solvent. The winding speed is controlled by a controller (not shown), independent from the casting speed of the casting apparatus 11.

Figure 3:
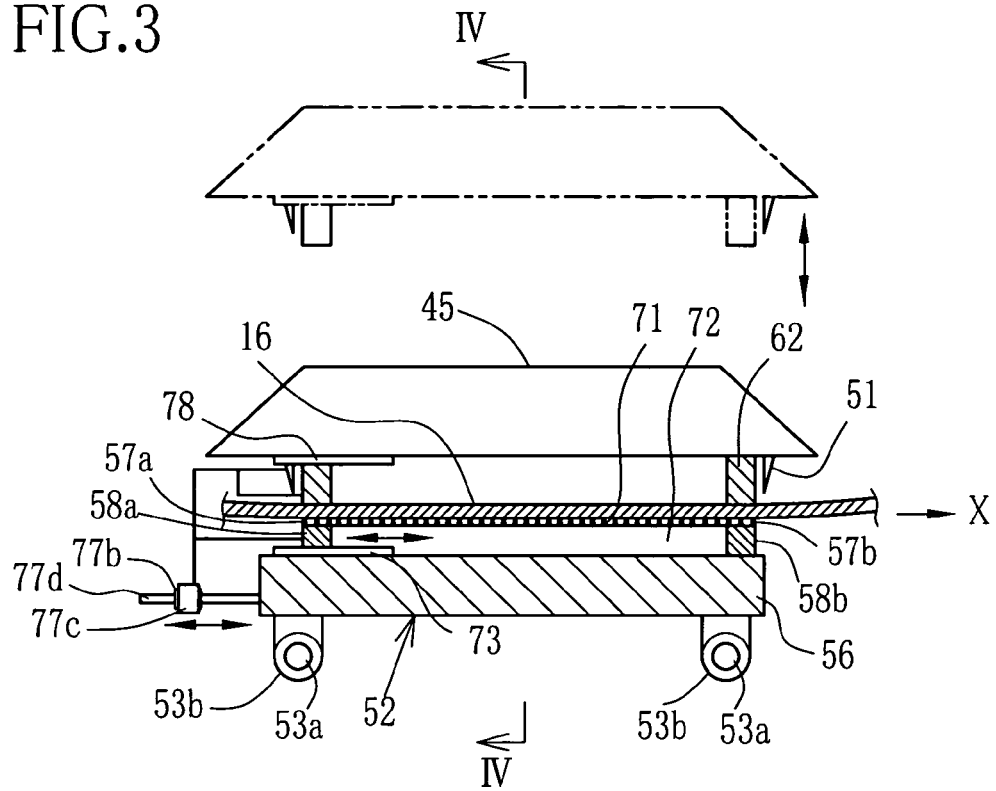
FIG. 3 is a sectional view of an inside of a first drying chamber in a film transporting direction.
Figure 4:
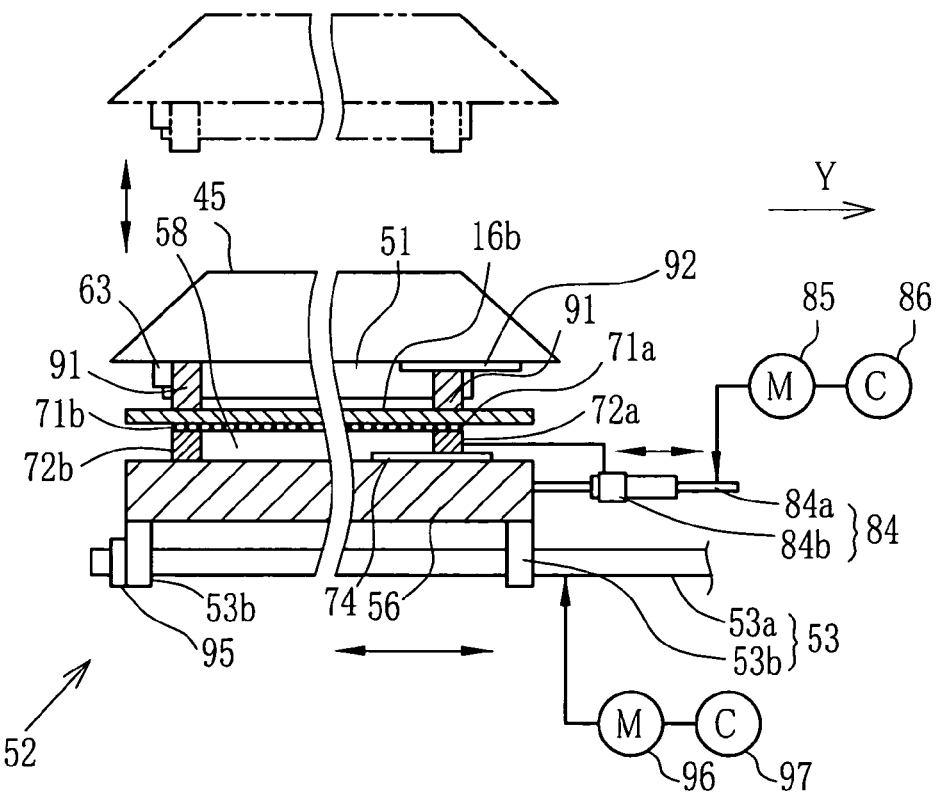
FIG. 4 is a sectional view in the first drying chamber along a line IV-IV in FIG. 3.

Then, as shown in FIGS. 3&4, in the movable stretch/relaxation device 52, the first pins 57a, 57b stretches the sheet film 16b in the X-axis direction, and the second pins 71a, 71b stretches in the Y-axis direction. The first pin stage 58a on which the first pins 57a are provided can be slidable on the rail 73 in the X-axis direction, and the second pin stage 72a on which the second pins 71a are provided can be slidable on the rail 74 in the Y-axis direction.

Figure 5:
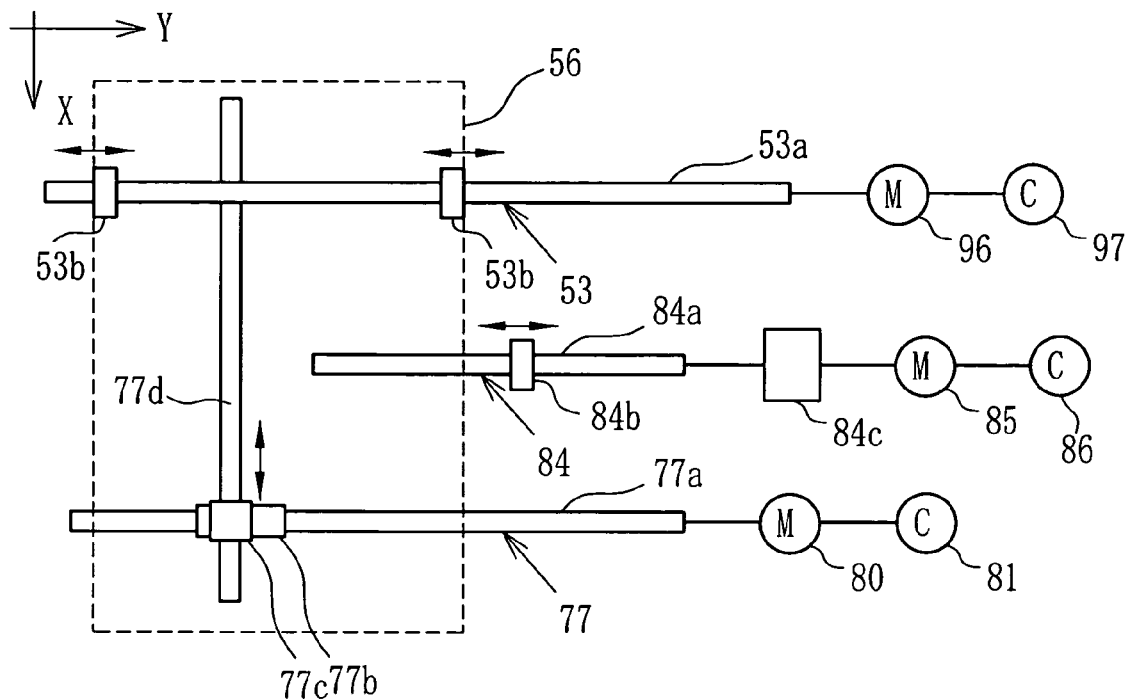
FIG. 5 is an explanatory view illustrating a shift of a shiftable stretch/relaxation device and a stretching and relaxation of the film.
Figure 6:
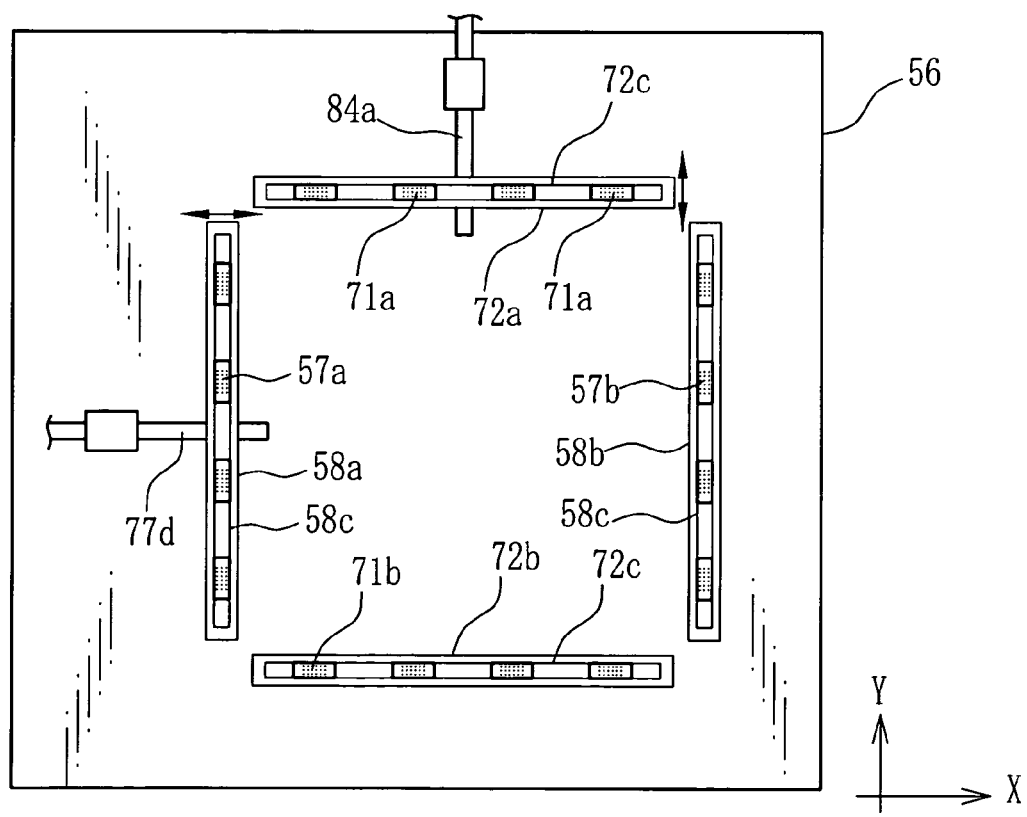
FIG. 6 is a plan view illustrating positions of the pins in the stretch/relaxation device.

As shown in FIG. 5, the shiftable stage 56 of the movable stretch/relaxation device 52 is provided with a sliding mechanism 77 for sliding the first pin stage 58a in the X-axis direction. In this embodiment, the sliding mechanism 77 has a spline shaft 77a, a ball spline 77b and a worm gear 77c. The spline shaft 77a is driven by a motor 80 so as to rotate a screw shaft 77d through a worm gear 77c. Thus the first pin stage 58a shifts in the X-axis direction. The drive of the motor 80 is controlled by a controller 81. The sliding mechanism 77 can be connected to the cutter blade 51 and the press member 62 that are disposed on a rail 78 on the drying nozzle 45, so as to adjust the positions of the cutter blade 51 and the pressure member 62. The sliding mechanism 77 performs the stretch and the relaxation of the sheet film 16b in the X-axis direction. Note in this embodiment that the first pin stage 58b is fixed to the slidable stage 56, and only the first pin stage 58a slides to perform the stretch and the relaxation. However, in order to perform the stretch and the relaxation, both of the first pin stages 58a, 58b may be sidable.

Further, the slidable stage 56, as shown in FIGS. 4&5, includes a shifting mechanism 84 constructed of a ball screw 84a as a sliding shaft and a female screw 84b which is threadably mounted on the ball screw 84a. The second pin stage 72a is connected to the female screw 84b and the ball screw 84a is driven through the shift device 84c by a motor 85 such that the female screw may shift in the Y-axis direction. The shift device 84c is constructed of a spline shaft and a ball spline. Note that the drive of the motor 85 is controlled by the controller 86. Thus the second pin stage 72a having the second pins 71a can slide in the Y-axis direction. Thus the shifting mechanism 84 can be connected to a press member 91 which is provided for the drying nozzle 45 so as to extend in the X-axis direction, and the position of the press member 62 on a rail 92 can be adjusted. Thus the stretch and the relaxation of the sheet film 16b in the Y-axis direction are made by actuating the shifting mechanism 84. Note in this embodiment that only the first pin stage 72a slides, and the second pin stage 72b is fixed to the slidable stage 56 to perform the stretch and the relaxation. However, in order to perform the stretch and the relaxation, both of the second pin stages 72a, 72b may be sidable.

The stretch/relaxation device 52 further has the moving mechanism 53 constructed of the shaft 53a as a ball screw and a female screw 53b threadably mounted on the shaft 53a, and is moved by actuation of the moving mechanism 53 from a contact point of the female screw 53b in the first drying chamber to a predetermined position in the third drying chamber, while the female screw 53 contacts to a stopper 95 at the contact point. At the same time, the shaft 53a is driven by a motor 96, and the drive of the motor 96 is controlled by a controller 97. Thus the stretch/relaxation device 52 moves in a range between the first-third drying chambers 21-23.

Note that the motors 80, 85, 96 are provided in outside of the first-third drying chambers 21-23, so as to prevent the influence on the inner temperature of the drying chambers 21-23 and the lower operations of the motor under the temperature fluctuation and the damages of the thermal expansion. Further, the controllers 81, 86, 97, the controller (not shown) for rotating the drum 19, the controllers 38, 42 for the automatic door and the drying nozzle, and the controller (not shown) for rotating the winding shaft can form a controller unit. Thus a program of all controlling conditions can be memorized of the controller unit. However, the present invention is not restricted in the above description, and the programs for controlling the conditions may be described separately.

Then operations of the present invention will be described. In the case of producing the film 16 in the film production equipment 10, the dope is supplied from the source to the casting die 18, and the casting die 18 cast the dope onto the drum 19 by the casting method. As the casting method, there are a method in which the dope free-falls onto the surface of the drum, and a method in which the predetermined pressure is applied to the dope in the casting die 18 so as to discharge the dope toward the drum 19. In the present invention, the sort of the die is determined in accordance with the casting method, and the preset invention is not restricted in the sorts. In this embodiment, the rotation of the drum 19 is made for a continuous casting, such that the peeled surface of the film 16 may be positioned in upper side. However, the rotational speed of the drum 19 and the position of the peeled surface are not restricted. Further, the casting speed is determined depending on the rotational speed of the drum 19 and can be changed in accordance with the production method in the tenter dryer 21 provided in the downstream side from the casting apparatus, even while the production is made. Further, the temperatures of the casting die 18 and the drum 19 are controlled by the predetermined temperature controlling method to adequate values for the casting.

The casting film 16a on the drum 19 is continuously peeled from the drum 19 by applying a tension to the film 16 in the transporting direction while the film 16 is lapped around the most downstream one of the rollers with drive of the most downstream roller. Then the casting film 16a is transported as the film 16 to the predetermined one of the drying chambers 21-23. Note that the peeling and the transporting may be made by applying the tension to the film in the transporting direction when other devices for the peeling and the transporting are substituted for the above ones. Note that since the range between the casting apparatus 11 and the entrance into the tenter dryer 12 is tightly closely disposed, the casting conditions and the transporting conditions of the casting film 16a and the film 16 are accurately controlled.

In the explanation below, an example of transporting the film 16 into the first drying chamber 21 is described. However, the film 16 may be transported into the second or third drying chamber 22, 23 depending on the objected processing conditions in the tenter dryer 12. In this case, the position of the drying chamber is changed adequately such that the film path may be connected to the predetermined drying chamber into which the film 16 is transported.

The doors 31, 32 of the first drying chamber 21 are open and the film 16 is continuously transported in a direction from the first drying chamber 21 toward the winding apparatus 13. At this moment, the drying nozzle 45 is positioned at the drying position. The transporting speed of the film 16 is adequately controlled by changing the rotational speed of the drum 19 or the roller 17 and the driving condition of the winding apparatus. When the transporting is made stably, the transporting speed is made smaller and the cutting of the film is made in the following.

When the transporting speed is made smaller, the drying nozzle 45 is shift to a lower side such that the film 16 is held by the stretch/relaxation device. In order to make the holding, the pressure member 62 of the drying nozzle 45 presses the film 16 such that the first pins 57a, 57b prick into the film 16. Further, the press member 62 as a resilient member presses the film 16, and when a point edge of the cutter blade 51 contact to the shiftable stage 56 of the stretch/relaxation device and the film 16 is cut off into the sheet film 16b. Thus the sheet film 16b is received by the shiftable stage 56.

In this embodiment, the circumstances in the first drying chamber 21 in which the cutting is performed is controlled to the first condition which is the same as the circumstance in casting and transporting into the first drying chamber. Thereby, it is preferable to keep the doors 33, 34 close, in view of the control efficiency. The cooled dope whose temperature is from −60° C. to 20° C. is cast onto the drum and the temperature of the transporting path to the first drying chamber 21 is kept uniform. In this case, the temperature of the first drying chamber 21 can be the same as that of the transporting path. Further, when the temperatures of the drum and the transporting path are higher than the room temperature, the temperature of the first drying chamber can be controlled to be the same as that of the drum and the transporting path. It is preferable to control before the holding of the film the temperature of the first and second pins 57, 71 as the holding members to the same as the temperature at the casting and of the transporting path. Thus when the film is held, the deformation of the film in accordance with the temperature variation can be prevented. For example, the stretch/relaxation device 52 is set for a predetermined period in, for example, the third drying chamber 23 in which the temperature is controlled for preventing the deformation of the film. Especially, the film is deposited for a predetermined period, and the doors 34, 35 are open during transporting the film 16 through the first drying chamber 21.

When the cutting is completed, the cutter blades 51 and the press member 62 shift to the drying position with the drying nozzle 45. Then the new front end of the continuous film 16 falls in effect of the own weight and is received by the receiver 69. Then the casting speed is small for the predetermined period. Otherwise, the sheet film 16b is wound around the winding shaft 68 of the winding apparatus 13 with containing the solvent and the water. The film 16 after the winding is recovered.

While the film 16 passes through the first drying chamber 21 and is cut into the sheet film 16b, it is preferable to drive the second and third drying chambers 22, 23 to predetermined drying conditions. Therefore, it is preferable to keep the doors 34, 35 close in the point of the promotion of efficiency. Further, in the second and third drying chambers 22, 23, the different drying conditions are set such that the sheet film 16b may be under the different drying conditions immediately.

The drying, the stretch and the relaxation of the film 16 may begin in the first drying chamber 21 in which the film 16 is made, and otherwise, may begin in the second or third drying chamber 22, 23. Since the drying, the stretch and the relaxation are independently controlled as described above, at least one or both of them may be made at the predetermined timing.

In the following, the processing of the sheet film 16b obtained by cutting the continuous film 16 is explained in the following. However, the explanation shows only one example, and the present invention is not restricted in it. At first, the drying condition of the second drying chamber is preset to the predetermined second drying condition. Thereafter, the door 34 is opened and the stretch/relaxation device moves such that the sheet film 16b may be conveyed into the second drying chamber 22. When the stretch/relaxation device 52 is set to the predetermined position in the second drying chamber 22, the door 34 is automatically closed. In the second drying chamber 22, since the drying condition is preset to the second drying condition, the inner conditions can be stabilized to the second drying condition soon even after the opening and closing of the door. Therefore, the sheet film 16b can be dried under the second drying condition immediately. Note that when the door 34 is closed, it is preferable to control the drying condition in the first drying chamber to the predetermined other condition which is necessary later.

When the stretch and the relaxation in the predetermined direction are made with the drying of the sheet film 16b, the shiftable stage 56 is not moved but the predetermined pin stages. For example, when the stretch or the relaxation in the widthwise direction (namely the Y-axis direction) is made, the motor 85 is driven such that the female screw 84b may shift in the Y-axis direction. Otherwise, when the stretch or the relaxation in the lengthwise direction (namely the X-axis direction) is made, the motor 80 is driven so as to shift the first pin stage 58a in the X-axis direction. Note that the X-axis direction is perpendicular to the Y-axis direction. Further, when the stretch or the relaxation is made in a direction at an angular to the X- and Y-axis directions, as described in the following in detail, a turn table is provided for rotating the shiftable stage 56 thereon. In this case, after the shiftable stage 56 can be rotated at the predetermined angle, the stretch and the relaxation can be made in any direction.

After the predetermined stretch and the relaxation are made in the second drying chamber 22, the sheet film 16b is, for example, conveyed into the third drying chamber whose drying condition is controlled to the third drying condition. The conveyance of the sheet film 16b to the third drying chamber 23 is similar to that of the sheet film 16b from the first to the second drying chamber 23. Namely, at first, the drive of the third drying chamber is stopped. Then, the door 35 is opened, and the stretch/relaxation device 52 moves such that the sheet film 16b is conveyed into the third drying chamber 23. When the stretch/relaxation device 52 is set to the predetermined position in the third drying chamber 23, the door 35 is automatically closed. In the third drying chamber 22, since the drying condition is stabilized to the third drying condition, the inner conditions can be set back to the third drying condition soon even after the opening and closing of the door. Therefore, the sheet film 16b can be dried under the third drying condition immediately. Note that when the door 35 is closed, it is preferable to control the drying condition in the second drying chamber to the predetermined other condition which is necessary later.

As described above, in the combination of the first to third drying chambers 21-23, the dry of the sheet film 16b is made in the drying process constructed of plural drying steps. Simultaneously, the predetermined control of the stretch and the relaxation is made. After all of the drying, the stretch and the relaxation are completed, the film 16 is conveyed back to the first drying chamber 21, and the door 33 is opened to form an exit opening. Then the sheet film 16b is fed out through the exit opening from the first drying chamber 21, and otherwise another winding shaft is set to the winding apparatus 13 to wind the sheet film 16b.

As described above, in the present invention, if the plural drying conditions are necessary for the film production, the predetermined film processing is made with immediate change of the drying condition. Then while the film is conveyed between at least one of the first-third drying chambers 21-23, the stretch/relaxation device 52 can be made. Note that the cutting of the film 16 to the sheet film 16b is preferably made at the same time as the beginning of holding the film by the stretch/relaxation device when the drying is made in one of the plural drying chambers. Further, in the above embodiment, the stretch and the relaxation of the film are made with use of the plural drying chambers. However, the drying chambers may be omitted and the stretch/relaxation processing may be made simultaneously.

In this embodiment, the cutting of the continuous film is made in the drying chamber 21. However, in the present invention, there may be a device for moving the transport passage from a downstream side from the support to one of the drying chambers, and other cutting device, instead of the cutter blade of the drying nozzle 45, in the upstream side from the drying chamber. Thus the cutting of the film 16 may be made before the film 16 is transported into the drying chamber. In this case, while the sheet film is held by the stretch/relaxation device, the sheet film 16*b* is fed to a drying machine, and the predetermined drying process is made to the film 16. Further, in the above embodiment, after the casting, the film 16 is cut to the sheet film 16*b*, and thereafter the stretch and the relaxation are made. However, in the present invention, the film formed by continuously casting may be dried in the drying chamber 21 adequately, and wound into a film roll by the winding apparatus 13. Then the film is unwound from the film roll and transported into the tenter dryer 12, in which the stretch and the relaxation may be made after the cutting into the sheet film. In this case, the drying after the casting isn't made in the drying chamber 21, another drying equipment is provided between the casting apparatus 11 and the winding apparatus 13, so as to dry the film in the drying equipment.

The holding member for holding the film 16 may be not the pin or the press member in this embodiment, but may be anything which doesn't have no bad influence on the film, such as the deformation of the production part of the sheet film 16*b*. For example, as shown in FIGS. 7A-9B, an integrated type unit type clip 160 and a separated type separate type clip 170 which sandwiches the sheet film 16 in the perpendicular direction may be used. Further, it is preferable to hold each of four sides or four corners. The clips for holding each of four sides are especially preferably used.

Figure 7A:
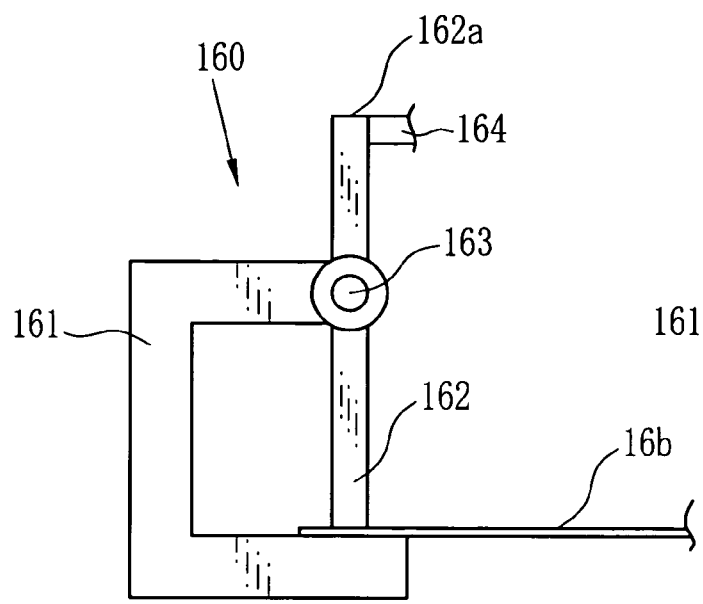
FIGS. 7A and 7B are side views of an integrated type clip used in the tenter dryer.
Figure 7B:
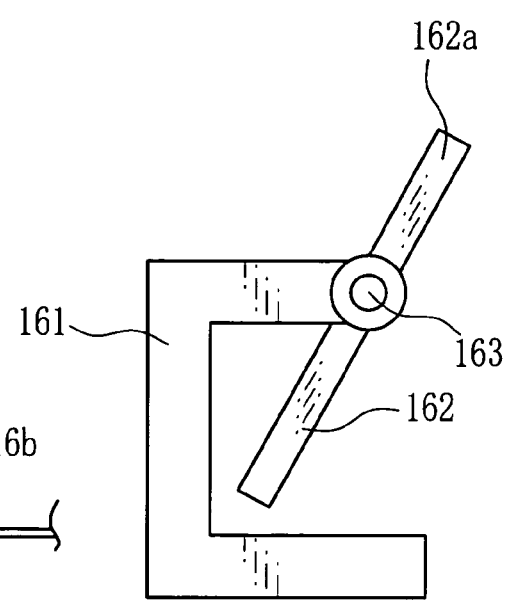

As shown in FIGS. 7A&7B, in the unit type clip 160, a clip main body 162 is attached to a nearly U-shaped clip frame 161, so as to be rotatable around an attachment shaft 163. The engaging member 164 is engaged with an upper portion of the clip main body 162, and therefore the clip main body 162 can be optionally rotated to a holding position (FIG. 7A) or to a clip releasing position (FIG. 7B).

Figure 8:
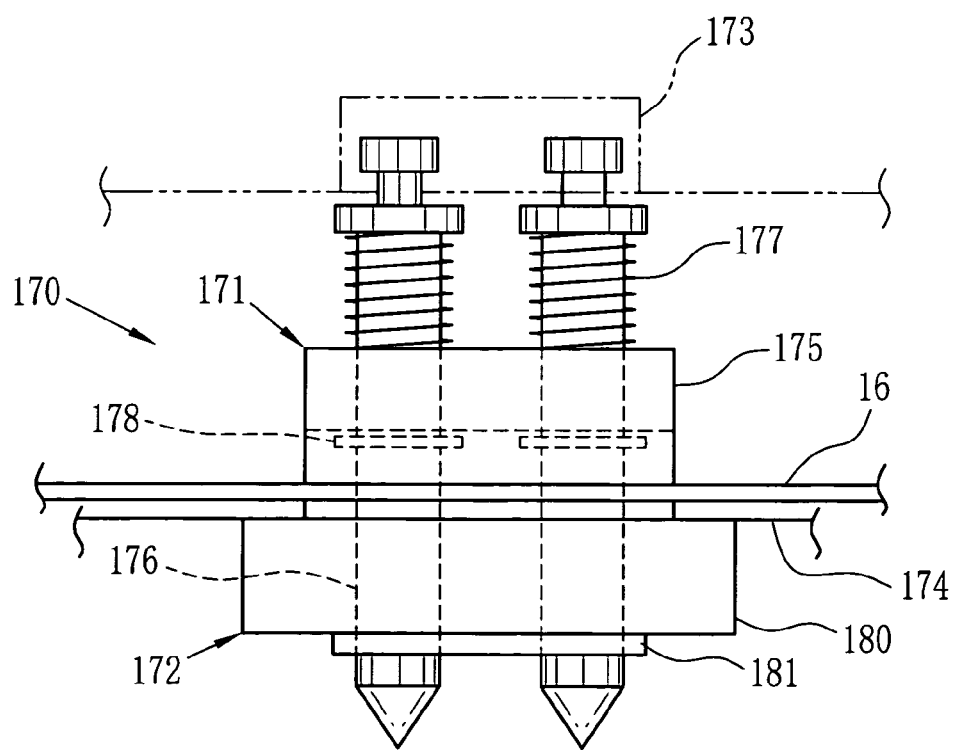
FIG. 8 is a front view illustrating a separated type clip.
Figure 9A:
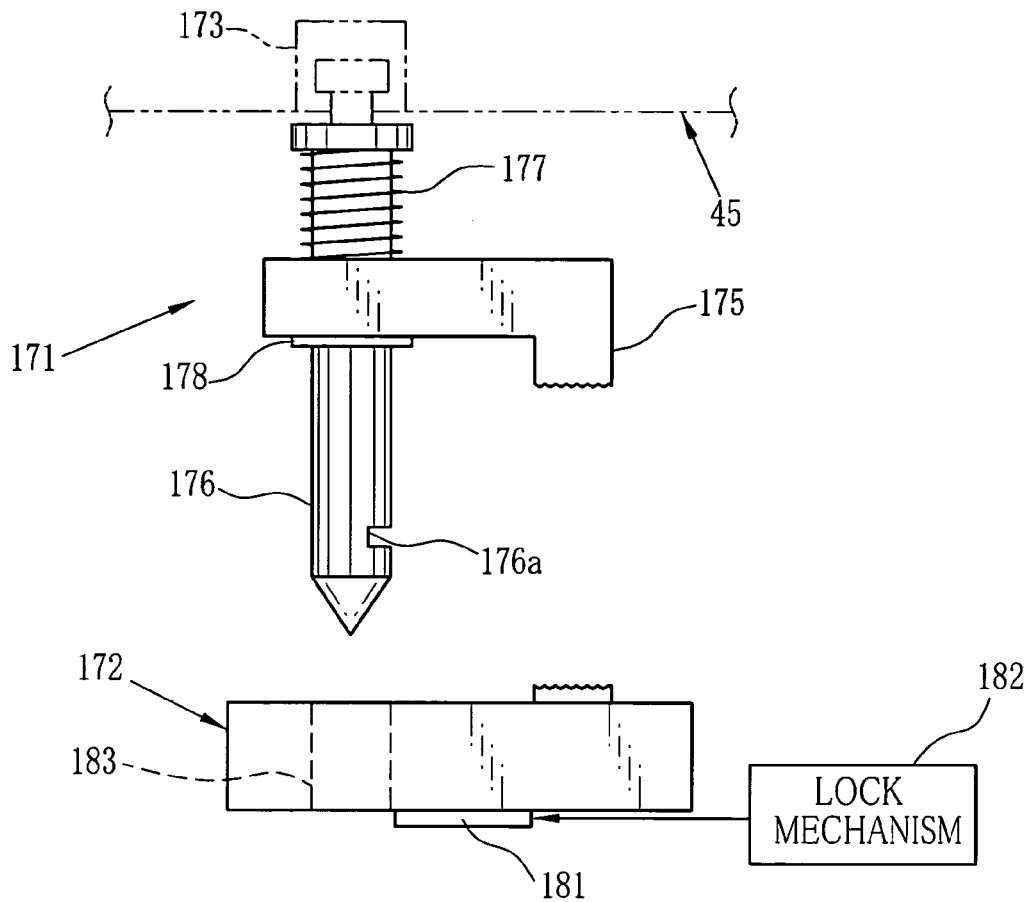
FIG. 9A is a side view of the separated type clip in the separated situation.
Figure 9B:
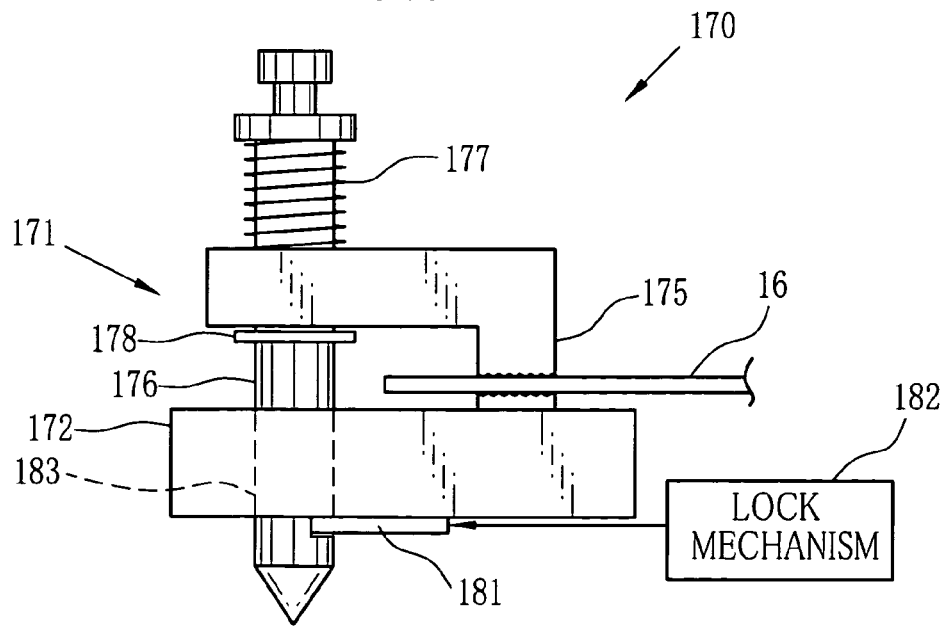
FIG. 9B is a side view of the separated type clip in the holding situation of the film.

Further, as shown in FIGS. 8-9B, the separate type clip 170 is constructed of an upper part 171 and a lower part 172. The upper part 171 moves up- and downwards with an upside portion being held by the upper clip holding portion 173 which is provided for the upper drying nozzle 45. Further, the lower clip 172 is attached to the clip holding stage 174 of the shiftable stage 56. The upper clip 171 has a clip main body 175 whose section has a L-shaped form, a two clip shafts 176 to which the clip main body 175 is attached, a coil string 177 is disposed with the shrink between the clip shafts 176 and the clip main body 175, and a clip main body stopper 178.

The lower part 172 is constructed of a main body 180, a lock member 181, and a lock mechanism 182. The main body 180 has a shaft hole 183 into which the clip shafts 176 are inserted, and a film holding member 184. The lock member 181 is shifted by the lock mechanism 182 between the lock position at which the lock member 181 engages with the lock groove 176*a* of the clip shaft 176 and an unlock position at which the lock member 181 is extracted from the lock groove 176*a*. When the clip shaft 176 descends to the film holding position, the lock member 181 enters into the lock groove 176*a*. Thus the lock mechanism 182 keeps a film holding situation. Further, when the film is released from the clip, the lock member 181 is extracted from the lock groove 181 in accordance to the lock releasing signal of the controller (not shown). Thereafter, the upside portion 176*a* of the clip shaft 176 is held by the holding portion 173 of the upper part 171, the upper drying nozzle 45 is ascended such that the upper part 171 may leave the lower part 172. Thus the film 16 is released. Note that the lock mechanism 182 may be a mechanical type in which the link mechanism may be used. In this case, a lever for detecting the insertion of the clip shaft 176 into the shaft hole 183 is provided. In accordance with the insertion of the clip shaft 176, the position of the engaging member is alternatively exchanged between the lock position and the lock-release position.

Figure 10:
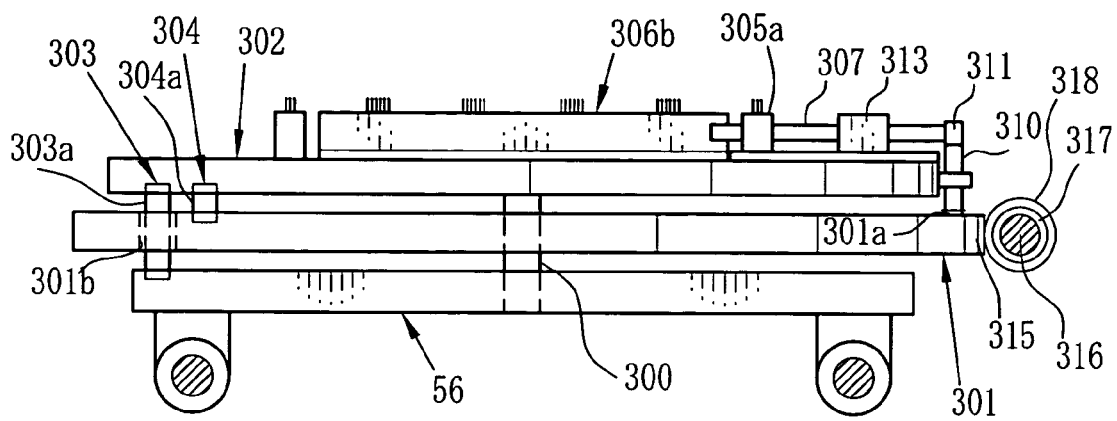
FIG. 10 is a front view illustrating another embodiment in which a direction of the stretch and the relaxation can be changeable.
Figure 11:
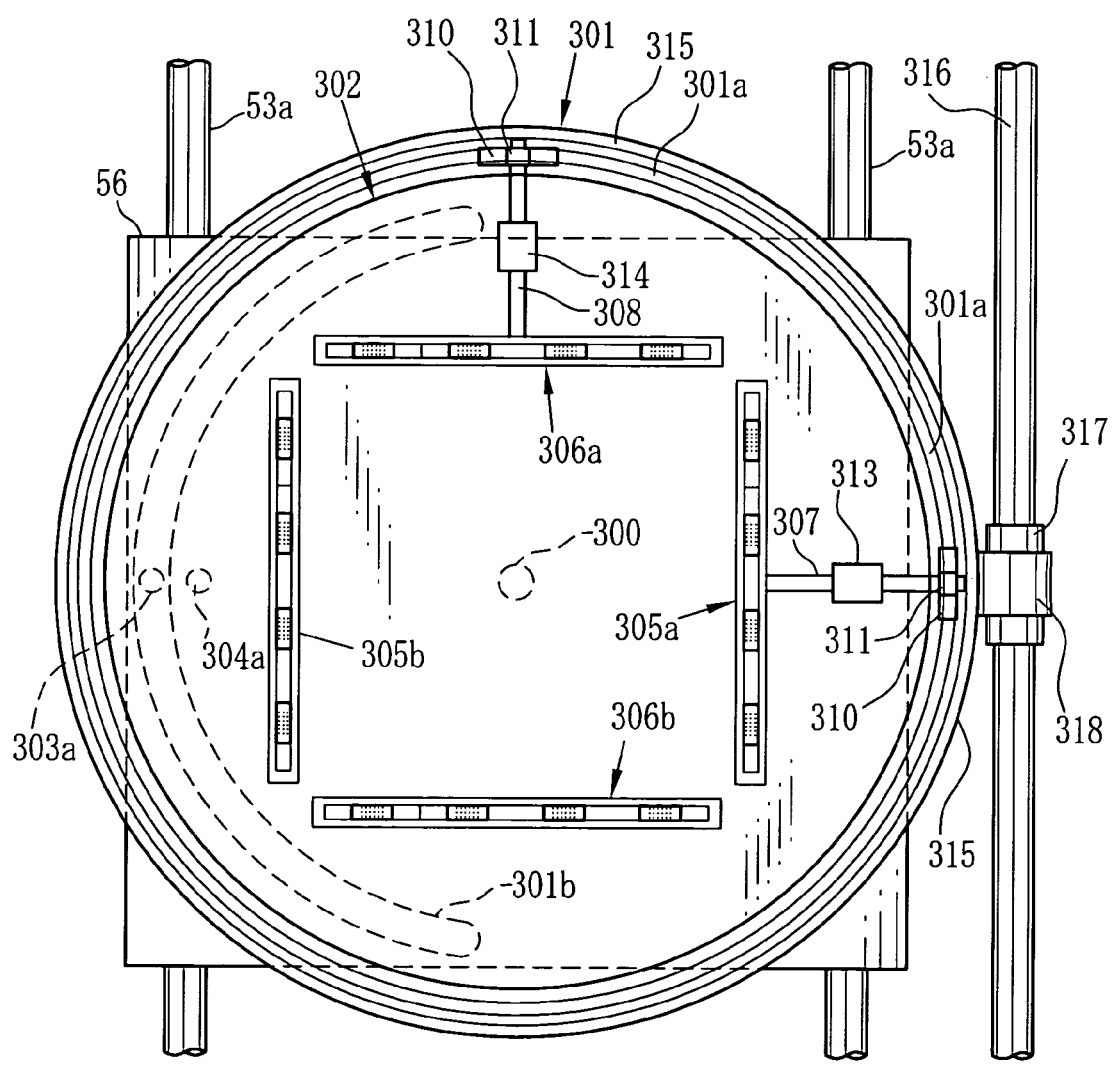
FIG. 11 is a plan view of the another embodiment in FIG. 10.
Figure 12:
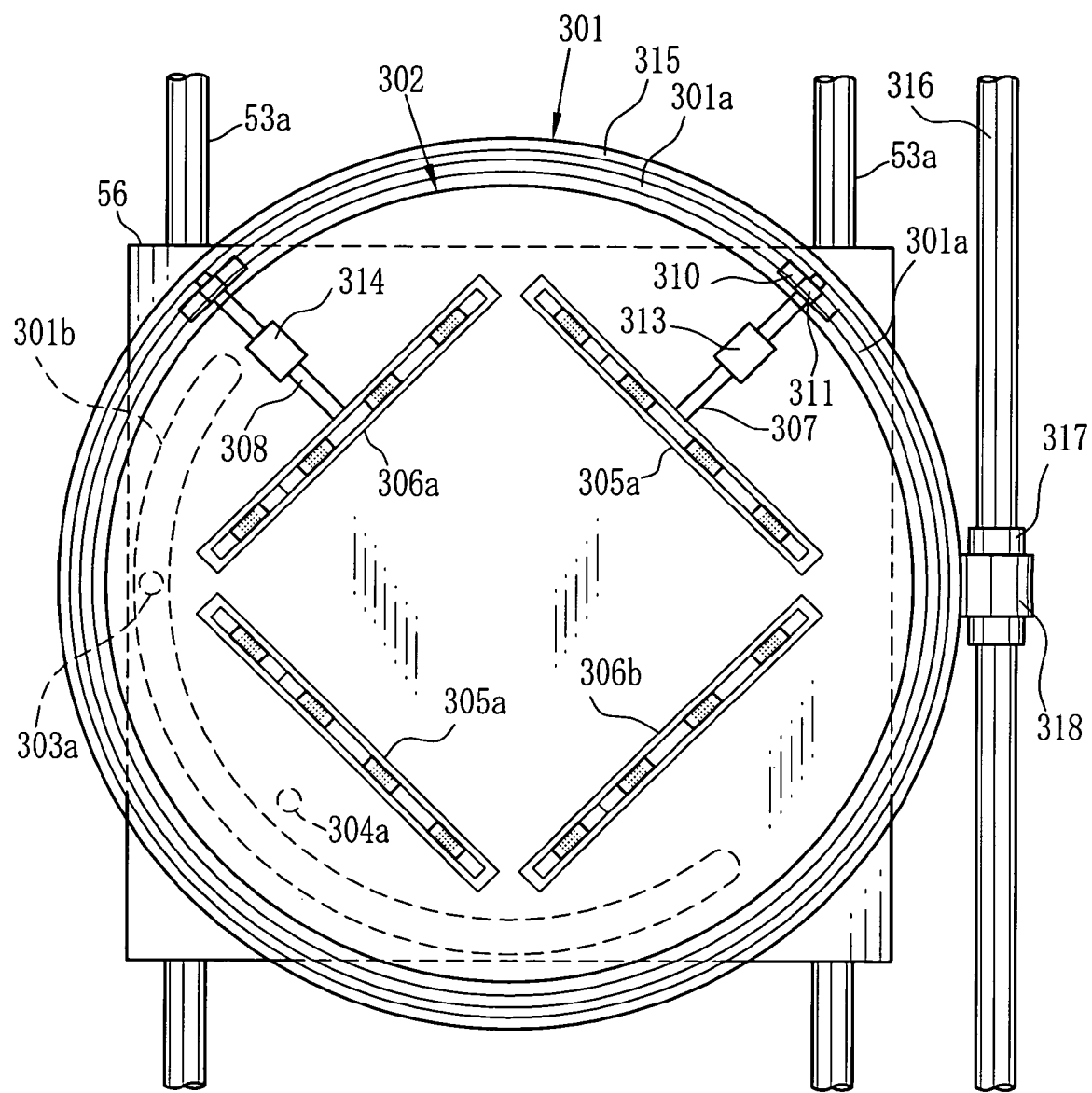
FIG. 12 is a plan view of the another embodiment in the situation that the direction of the stretch and the relaxation is changed.

Further, in the above embodiment, the stretch and the relaxation of the film 16 in the X- and Y-axes are made. However, the stretch and the relaxation may be made at any angle to the X- and Y-axes. In this case, as shown in FIG. 10, a ring gear 301 and a turn table 302 are provided on the shiftable stage 56 to be independently rotatable around a rotary shaft 300. Then a first clutch 303 is provided between the ring gear 301 and the turn table 302 and a second clutch 304 is provided between the ring gear 301 and the turn table 302. The clutches 303, 304 are, for example, constructed of engaging pins 303*a*, 304*a*. The engaging pins 303*a*, 304*a* protrude to engage with the turn table 302, and thus the intermittent gear 310 and the turn table 302 are fixed to the shftable stage 56. Further, when the engaging pins 303*a*, 304*a* retracts from the turn table 302, the linkage is released and the ring gear 301 and the turn table 302 are freely rotated. Note that the arc-shaped through hole 301*b* is formed in the ring gear 301. Thus the engaging pin 303*a* don't contact to the ring gear 301 such that the engaging pin 303*a* may not rotate with the ring gear 301.

On the turn table 302, similarly to the above embodiment, there are first pin stages 305*a*, 305*b*, and second pin stages 306*a*, 306*b*. The first pin stage 305*a* and the second pin stage 306*a* are slidable and threadably attached to the shifting shafts 307, 308 as screw shafts, and other pin stages 305*b*, 305*b* are fixed. The shifting shafts 307, 308 are meshed through an intermittent gear 310 and a driven gear 311 to a ring gear main body 301*a*, and each shifting shaft 307, 308 rotates by the rotation of the ring gear 301. Further, the third clutch 313 and the fourth clutch 314 are connected to the shifting shafts 307, 308, respectively. Thus the drive of the ring gear 301 is transmitted when each of the third and fourth clutches 313, 314 is in the ON-state.

A worm wheel 315 is attached to a part of the ring gear 301, for example in the range of 180° to a rotational center. To the spline shaft 316 is meshed a worm gear 318 which is attached through a ball spline 317. When the spline shaft 316 rotates in the clock or the counterclockwise direction of this figure, the ring gear 301 rotates through the ball spline 317 and the worm gear 318. Simultaneously, the first clutch 303 has been turned in an OFF-state, and the ring gear 301 and the turn table 302 are fixedly connected so as to rotate the turn table 302. Further, the second clutch has been turned to the ON-state, and thus the ring gear 301 and the turn table 302 are fixedly connected to rotate the turn table 302. The relation of the rotation number of the spline shaft 316 to the rotational angle of the turn table 302 is previously obtained. Therefore the spline shaft 316 is rotated such that the rotational angle may be the predetermined one. Thus the positioning of the turn table 302 at the predetermined rotational angle is made. Thereafter, the first clutch 303 is turned to the ON-position, such that the shiftable stage 56 is fixedly connected to the turn table 302. Then the second clutch 304 is turned in OFF-state, the connection of the ring gear 301 to the turn table is released, and the third clutch 313 and the fourth clutch 314 are selectively turned in ON-state. Then the first pin stage 305*a* or the second pin stage 306*a* is shifted so as to perform the stretch and the relaxation of the sheet film 16*b*. Note that the boll spline 317 and the worm wheel 315 slide in accordance with the shift of the shiftable stage 56. Further, instead of the change of the rotational angle on the basis of the rotation number, a sensor is provided at each predetermined angle in the rotational direction, and the rotation number of the spline shaft 316 is controlled on the basis of the output of the sensor.

In the film stretch/relaxation process, the third and fourth clutches 313, 314 are turned to ON-state, and thus the rotation of the driven gear 311 is transmitted to the shifting shafts 307, 308. Further, the clutches 313, 314 are turned to OFF-state, the connection of the driven gear 311 to the shifting shafts 307, 308 is released. Thus the driven gear 311 rotates without meshing, and therefore the rotation is not transmitted to the shifting shafts 313, 314. Therefore, the third and fourth clutches 313, 314 are alternatively turned, so as to slide the slidable first and second pin stages 305a, 306a. Thus the stretch and the relaxation of the film 16 can be made.

As described above, instead of rotation of the turn table 302 and shift of the slidable first and second pin stages 305a, 306a by the rotation of the spline shaft 316, the rotation of the turn table 302 and the shifts of the slidable pin stages 305a, 306a are independently made with use of another spline shaft. Further, in the above embodiment, through the shift of the shiftable stage, the stretch and the relaxation are made through the shaft 53a and the spline shaft 77a, 316. However, in the present invention, a drive source, (such as the motor, a hydraulic cylinder or a pneumatic cylinder) may be independently provided for performing the shift of the shiftable stage, the stretch and the relaxation. In this case, in order to prevent the influence of the thermal energy from the atmosphere in each drying chamber, the drive source having the heat resistance is used and the drive source is covered with a heat insulation wall for cooling.

Other processing may be made in the film production equipment described above. An example of the other processing is shown in FIGS. 13&14, in which the same members and the like as in FIG. 1 are provided for the same number and the explanation thereof is omitted.

Figure 13:
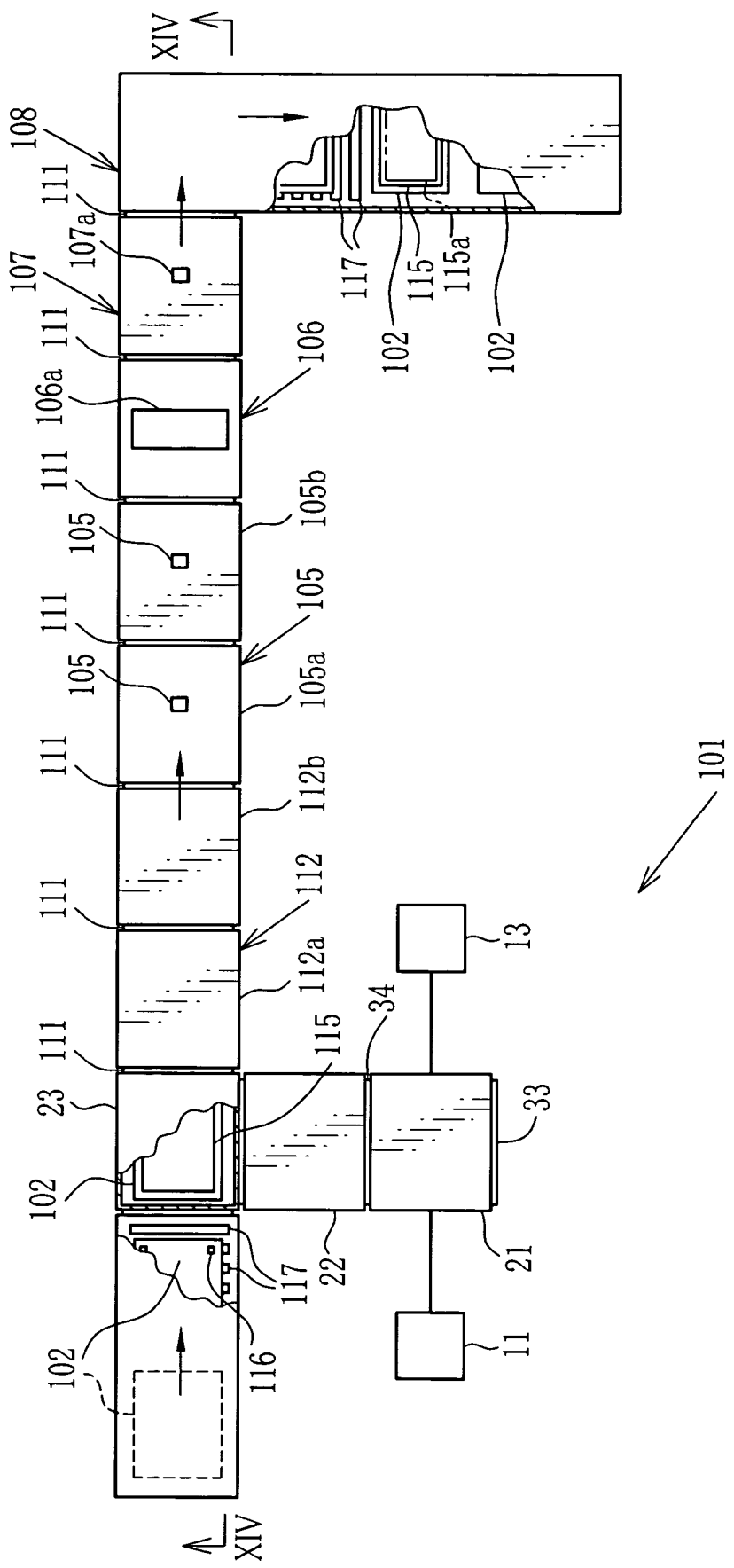
FIG. 13 is a schematic view of the film production equipment illustrating still another embodiment.
Figure 14:
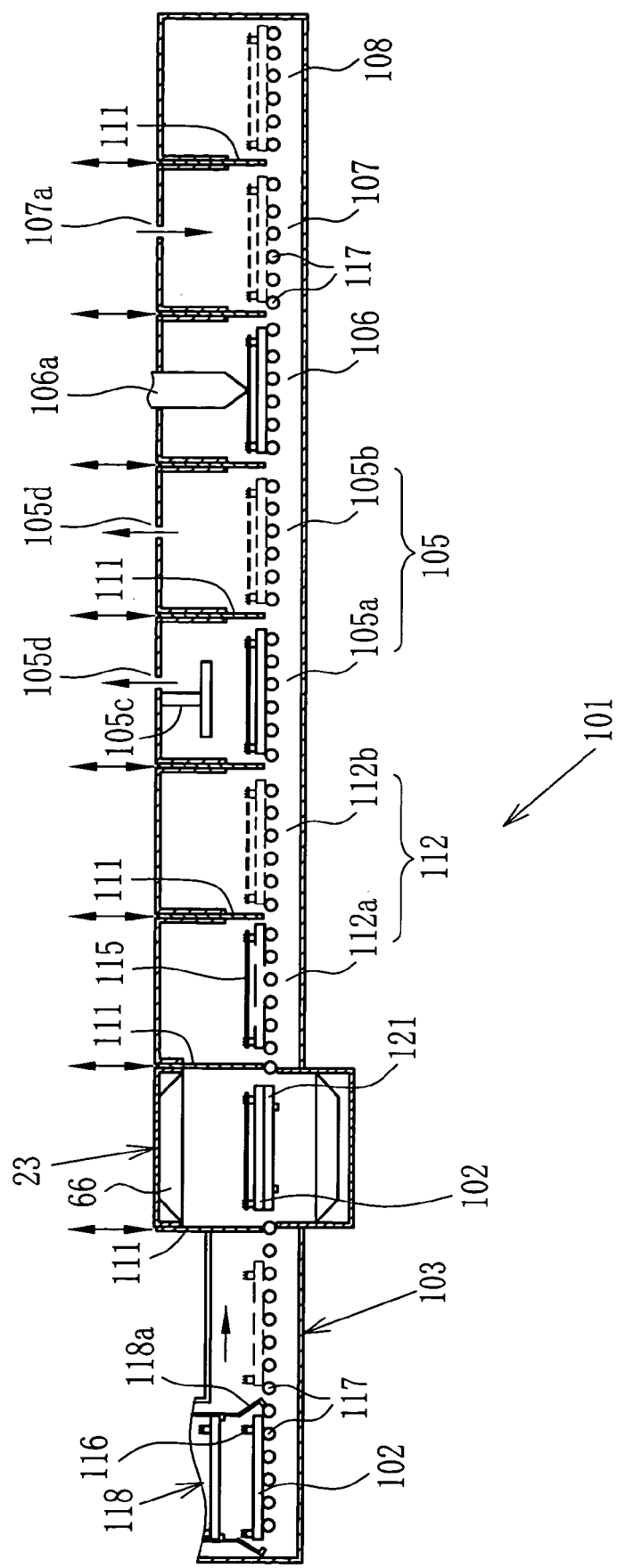
FIG. 14 is a sectional view of the film production equipment in FIG. 13 along a line XIV-XIV.

As shown in FIG. 13, a film production equipment 101 includes a supply apparatus 103, a vapor depositing section 105 disposed, a coating apparatus 106, a drying apparatus 107 and an accumulating/cutting apparatus 108 in a downstream from the third drying chamber 23. The supply apparatus 103 supplies a movable stretch/relaxation frame 102 supplies one after another into the third drying chamber 23. An inner space of each apparatus or each interval space between the apparatuses is sectioned, and in the sections the inner circumstances are independently controlled, and there are automatic doors 111 between the neighboring sections. The inner circumstances is mainly temperatures, and subsidiary humidity and concentrations of solvent vapor. Although sensors and controllers for controlling the inner circumstances are provided, they are not shown. Each of the vapor depositing section and a queuing section 112 which is disposed between the third drying chamber 23 and the vapor depositing section 105 has two sections whose numbers are 112a, 112b, 105a, 105b.

The stretch/relaxation frame 102 has pins 116 for holding a sheet film 115 in the similar manner to the stretch/relaxation device 52. Note that the pins 116 are disposed so as to hold not each edge but four corners of the sheet film 115. The reason why a frame for holding the sheet film 16b is used in this embodiment is that the accumulating/cutting apparatus 108 cuts the sheet film 115 in the frame at a predetermined size. However, the shape of the pins 116 is not restricted in it.

The supply apparatus 103 includes a supply section 118 for supplying the stretch/relaxation frame 102 onto feed rollers 117, and hold-supplying devices 118a in the supply section 118 hold the stretch/relaxation frame 102 and release it on the feed rollers 117. In this embodiment, the feed rollers 117 feed the stretch/relaxation frame 102. However, the present invention is not restricted in this embodiment, and a feed belt may be used for feeding the stretch/relaxation frame 102.

At least one of the first-third drying chambers 21-23 includes a frame conveyer 121 in which the stretch/relaxation frame 102 is conveyed among the first-third drying chambers 21-23. Further, in the frame conveyer 121, there are an interlocking device (not shown) which is driven to shift the pins of the stretch/relaxation frame 102 for performing the stretch and the relaxation. Thus the stretch and the relaxation are performed. Further, the frame conveyer 121 includes a conveying member (not shown) for conveying the sheet film 115 with the stretch/relaxation frame 102 into the queuing section 112 after the dry, the stretch and the relaxation.

In the queuing section 112, the temperature is adjusted to the most adequate condition for the vapor deposition as the next processing. In the vapor depositing section 105, a vapor deposition device 105c forms a vapor deposition layer of predetermined material on the sheet film 115, and a suction port 105d decreases the inner pressure.

The coating apparatus 106 includes a coating die 106a for coating the coating solution on the sheet film 115, and the drying apparatus 107 includes an air feed port 107a for feeding the air into an inside so as to dry a coating layer.

The accumulating/cutting apparatus 108 has a die cutting device (not shown). While the stretch/relaxation frame 102 holds the sheet film 115 after the drying, the die cutting device cuts the sheet film 115 along a cutting line 115a. The accumulating/cutting apparatus 108 accumulates the sheet films 115 at a predetermined position, and feeds the stretch/relaxation frame 102 to a predetermined position which is downstream from a cutting position.

Between and in the queuing section 112 and the accumulating/cutting apparatus 108, the feed rollers 117 are provided for feeding the stretch/relaxation frame 102.

The operations of this embodiment will be explained in following. The operations from the casting apparatus 11 to the first drying chamber 21 is the same as the former embodiment, and therefore the explanation thereof will be omitted. Before the casting and the transporting in the first drying chamber become stable, the supply apparatus 103 supplies the stretch/relaxation frame 102 into the third drying chamber 23. Before or at the supply, the frame conveyer 121 enters into the third drying chamber 23. Further, the stretch/relaxation frame 102 is set to the frame conveyer 121, and the temperature in the third drying chamber 23 is controlled such that the temperature may be adequate for holding the sheet film 115. The control may not be in the third drying chamber but in the second drying chamber 22 after the stretch/relaxation frame 102 is moved into the second drying chamber 22.

When the film transportation becomes stable, the automatic door 34 is opened and the frame conveyer 121 moves into the first drying chamber the stretch/relaxation frame whose temperature is controlled. Then, the door 34 is closed, and the film 115 is cut into the sheet films in a similar manner to the former embodiment. Therefore, the explanations of the cutting, the drying, the stretch and the relaxation are omitted.

The film after the dry, the stretch and the relaxation is transported from the third drying chamber 23 to the queuing section 112 while the sheet film is held by the stretch/relaxation frame 102. After the temperature control, the vapor deposition of the metal is made on the film held by the stretch/relaxation frame 102 to form the vapor deposition layer. Then the film is transported to the coating apparatus 106. After the coating layer is provided on the sheet film 115, the die cutting of the film to sheet films having predetermined size is made and the sheet films are accumulated in the accumulating/cutting apparatus 108.

In the above two embodiments, since the number of the drying chambers is three, one or more other drying chamber for cooling or heating the film may be provided. However, depending on the film to be produced, it is often necessary to perform the dry, the stretch and the relaxation of the film in multi steps of the drying conditions. In this case, the number of the drying chamber is preferably at least four. Further, as in the second embodiment, some processing of the sheet film is sometimes necessary after the predetermined drying processing. In this case, a production line for the post-processing is connected to the predetermined drying chamber such that the film is obtained after the post processing, and further, other drying chamber is connected to the accumulation device and the like such that the film is obtained without the post processing. Otherwise if it is designated to change the sort of the post processing for each sheet film, the post processes are connected to the plural drying chambers. Thus the several sorts of the sheet film after the different post processes are produced.

Figure 15:
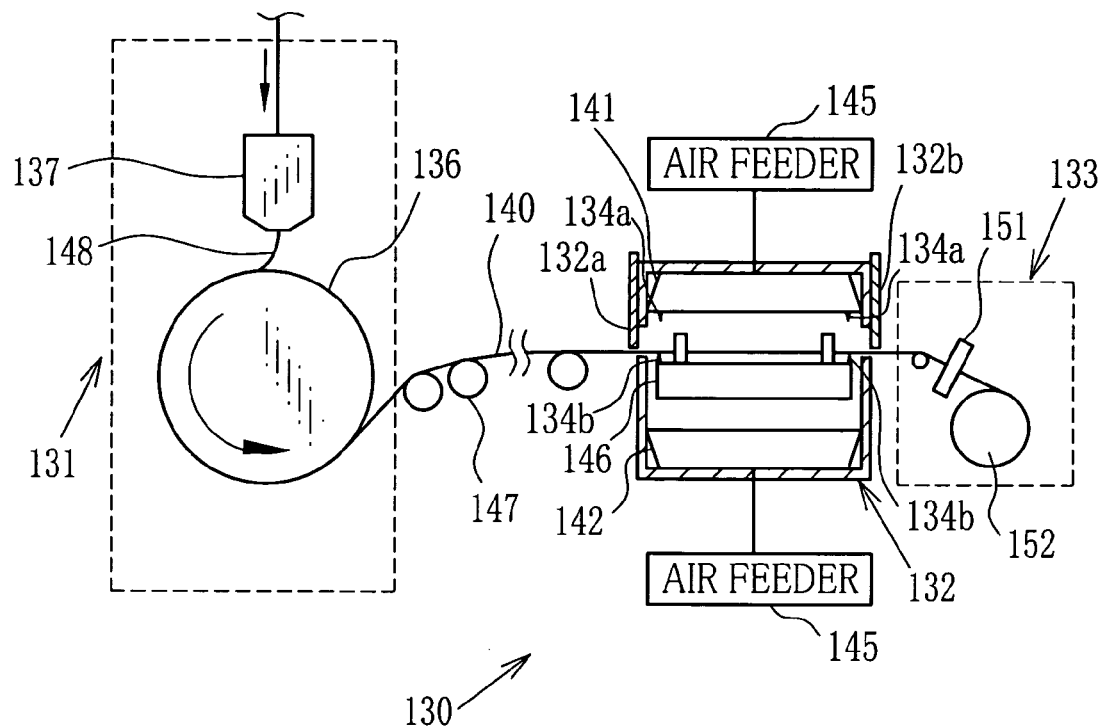
FIG. 15 is a side view including a partially sectional view of a film production apparatus in which a solution is cast to form a single layer.
Figure 16:
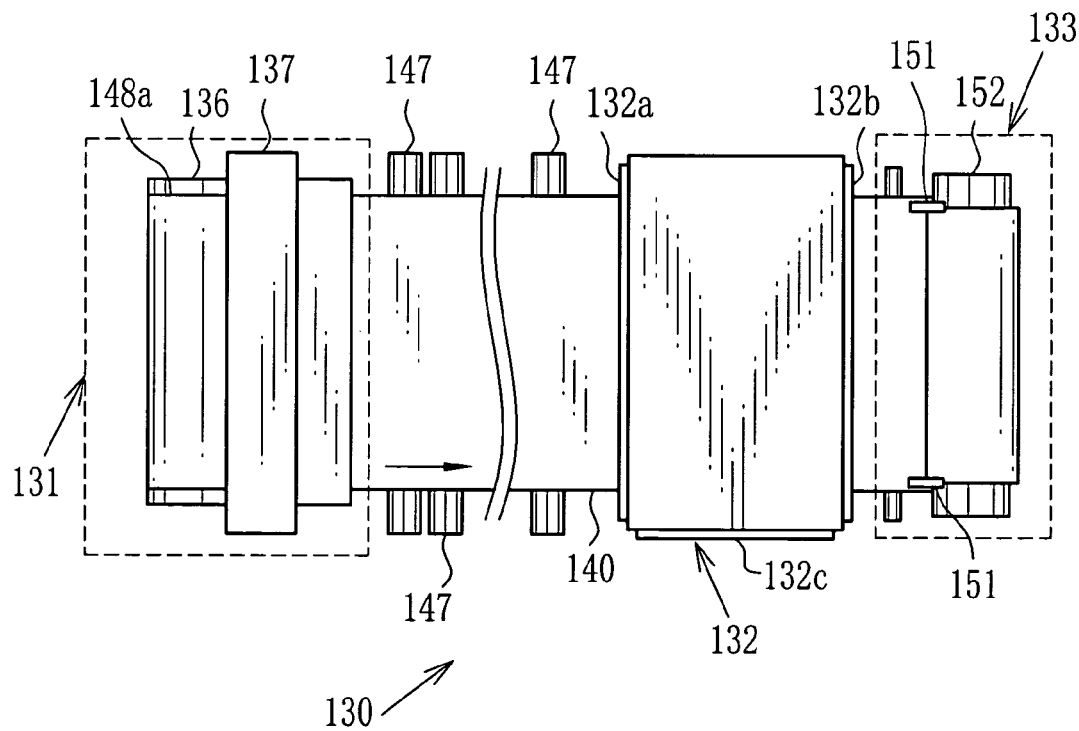
FIG. 16 is a plan view of the film production apparatus of FIG. 15.
Figure 17:
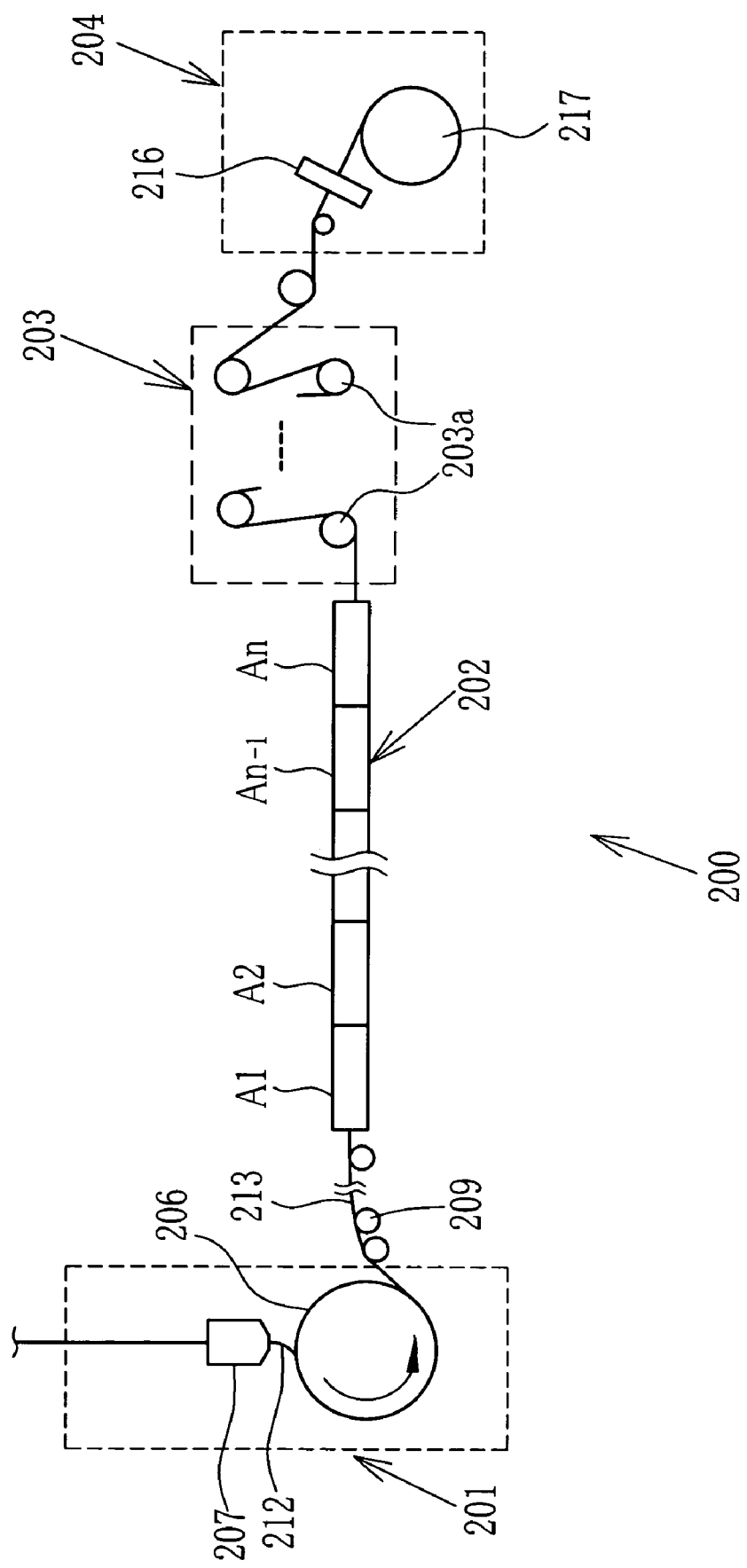
FIG. 17 is a side view of the film production apparatus of the prior art.

The number of the drying chamber may be one, whose embodiment will be explained in the following. Namely, also in this embodiment, the casting is made to form the continuous film, and the film is cut to the sheet films having predetermined size in the lengthwise direction. Further, the producing conditions may be changed for the sheet film. This type is called as an unit continuous type. As shown in FIGS. 15&16, a solution casting equipment 130 of the unit continuous type includes a casting apparatus 131, a tenter dryer 132 and a winding apparatus 133.

The casting apparatus 131 includes a support 136 and a casting die 137. The tenter dryer 132 includes a door 132*a* for opening/closing an entrance of a film 140, a door 132*b* for opening/closing an exit of the film 140, and a door 132*c* for opening/closing a sampling exit through which the sample is obtained. The opening and closing of the doors 132*a*-132*c* are automatically controlled by a controller (not shown). Further, in the tenter dryer 132, there are ducts 141, 142 in both sides from the film 140. Further, cutter blades 134*a*, 134*b* as the cutting members are provided in at least one of the film side and a fixed stretch/relaxation device 146 of the duct 141. As the cutter blades, several sorts of the cutter blades already known may be used, and for example, as shown in FIG. 15, when an inner cutter blade 134*a* and an outer cutter blade 134*b* are used, the cutting may be also made with a saw blade which is provided on the fixed stretch/relaxation device 146. The cutter blades 134*a*, 134*b* cut the film 140 by descending the duct 141. The ducts 141, 142 are connected to an air feeder 145 for feeding out an air whose temperature and the blow speed are controlled. Thus the inner temperature and the exchange of the inner air are controlled in the tenter dryer 132 by a controller (not shown). Further, the duct 141 above the film 140 can shift up- and downwardly by a shift device (not shown), and thus the air pressure to the film 140 can be made.

The tenter dryer 132 further includes the fixed stretch/relaxation device 146 which holds each edge of four sides or four corners of the film 140 so as to perform the stretch and the relaxation. The stretch/relaxation device 146 includes a holding assembly (not shown) for holding both side edges of the film 140, a shifting mechanism for shifting the holding assembly, and a controller (not shown) for controlling the shifting mechanism. Thus the shift of the holding assembly is regulated. The holding assembly can shift in the transporting direction of the film 140 (namely a casting direction at the casting) and the width direction, and thus the stretch and the relaxation of the film 140 can be made in the width or the transporting direction. Between or in the devices, rollers 147 are provided for supporting the film 140.

If the film is produced with use of the solution casting equipment 130, the casting die 137 casts a dope 148 on the support 136 in the casting apparatus 134. The cast dope 148 forms the casting layer 148*a*, which is peeled as the film 140 with content of the solvent from the support 136. Then the film 140 is fed sequentially at the predetermined length into the tenter dryer 132. Part of the film 140 fed into the tenter dryer 132 is cut off into the sheet film by the cutter blades 134*a*, 134*b* as the cutting device, and simultaneously four corners, both side edges or front and back edges are held by the clip, and the sheet film is dried with performing the stretch and the relaxation in the widthwise direction or the moving direction. Instead of the clip, the pins may be used as in the former embodiment, so as to prick the film for holding the film. The drying conditions such as the temperature and the flow speed of the drying air are longitudinal controlled depending on the procedure of the stretch, the relaxation and the drying. When the conditions of the stretch, the relaxation and the drying become predetermined ones, the feed of the film 140 is made at the predetermined length. Thus a following part of the film 140 is fed into the tenter dryer 132, and cut off to the sheet film. Then the stretch, the relaxation and the drying of this sheet film are made. Thus the continuous film 140 is cut into the sheet films, and the dry, the stretch and the relaxation of the sheet films are made one by one. In the winding apparatus, both side edges are slit or trimmed off by a slitter 151, and the remaining part of the sheet film is wound around a wind shaft 152.

Further, the present invention is not restricted in the continuous production from the casting process, and for example, may be applied to the stretch and the relaxation of the film, which is wound around the wind shaft after the drying. The film which is wound around the wind shaft after the drying hardly contains the solvent and the water, and since the content is extremely small, it is too hard to make the stretch and the relaxation. Therefore, before the stretch and the relaxation are made in the drying chamber as in the above embodiments, the film which is continuously unwound from the wind shaft and the like is preferably contacted to the solvent, the water and the like. As the method of contacting the film to the solvent, the water and the like, there are a method in which the film is dipped into a liquid, a method of spraying a liquid to the film, a method of coating the film with the liquid and the like. Further, the film can be softened by heating without contacting to the solvent, the water and the like. In this case, the film may be preheated before being fed into the tenter dryer, and otherwise both of the heating and then the stretch and the relaxation may be made in the tenter dryer. As the method of heating the film, there are a method in which the film is supported by the heated roller, a method in which a thermal chamber is used, and the like. Further, in order to soften the film, both of the contacting to the liquid and the heating may be made.

Further, after the drying of the film is made, the film is cut to the sheet films. Then, for example, the four corners of each sheet film are held, and in this situation the softening treatment described above may be made. For example, in the above second embodiment, the softening process may be connected to at least one of the drying chamber. In this case, after the film is held by the stretch/relaxation frame, the sheet film is transported to the softening process in the same holding situation. Then, after the softening process, the sheet film is fed back to the drying chamber which is connected to the softening process. Thereafter the drying, the stretch and the relaxation are performed.

The effects of the present invention are as follows. The film production equipment of the present invention cut the film with content of the solvent to the sheet films, and the stretch and the relaxation of each sheet film are made. Furthermore, the stretch and the relaxation can be made in any direction by rotating the stretch/relaxation device. Thus the film having any orientation angles can be produced.

In the stretch and the relaxation, while each of the four sides of the sheet film are held, the holding of the film is made stably and the stretch and the relaxation are made without the local generation of the tension or the pressure. Further, in the plural drying chambers, the inner conditions are independently controlled. Therefore if it is necessary to dry under the plural drying conditions, the drying conditions can be smoothly changed. Thus the production efficiency becomes higher, and if the production is stopped, the time necessary for starting the drive again can be made shorter. Furthermore, since the stretch/relaxation device can move among the plural drying chambers, the stretch and the relaxation are made under the adequate drying conditions, and the efficiency can be made higher. Further, in the present invention, as shown in the above embodiment, the stretch and the relaxation can be made during the shift between the drying chambers. Therefore, the production efficiency can be made higher, and the repeatability of the conditions for controlling the processes can be made by the computer in which the programming is made.

Further, as in the second embodiment, the present invention can be applied an embodiment in which it is designate to produce only some sheet films and each sheet film is provided with the vapor deposition layer, the coating layer and the like for the film after the dry, stretch and the relaxation. In this case, the drying chamber into which the sheet film in the production line is conveyed is previously determined depending on the sorts of the film, so as to perform the necessary process in the drying chamber. Thus a wide variety of an optical film having several functions can be produced in small quantities.

Further, according to the present invention, the sheet film to which the stretch and the relaxation are performed is produced from the film after the drying.

Furthermore, in the present invention, while the cutting devices are provided in the drying chambers, the tenter dryer and the film production equipment can be miniaturized. For example, in the above first embodiment, the area occupied by the solution casting equipment is around 3 m×3 m.

As described above, since the tenter device of the present invention is used, the film production equipment can be miniaturized, and a wide variety of the sheet films with small quantities can be stably and effectively produced. Further, the loss of the raw materials can be made smaller.

Various changes and modifications are possible in the present invention and may be understood to be within the present invention.

What is claimed is:

1. A film stretching apparatus comprising:
    a drying chamber for drying a film containing a solvent or a water;
    a cutting device for cutting said film to sheet films during the drying; and
    a stretching device for stretching said sheet film in a predetermined direction in said drying chamber,
    wherein said cutting device cuts said film widthwise to form rectangular sheet films having a predetermined size in a lengthwise direction.

2. A film stretching apparatus comprising:
    plural drying chambers for drying a film containing a solvent or a water;
    a cutting device for cutting said film to the sheet films before or during the drying; and
    a stretching device for stretching said sheet film in a predetermined direction in said drying chambers,
    wherein said stretching device includes a first stretcher for stretching said film in a first direction and a second stretcher for stretching said film in a second direction perpendicular to said first direction,
    at least one of said first and second stretchers has a holder for holding edges of said sheet film and a shifting mechanism for shifting said holder, and
    said cutting device cuts said film widthwise to form rectangular sheet films having a predetermined size in a lengthwise direction and said stretching device performs the stretching of said sheet films during the drying in said plural drying chambers.

* * * * *